US012700393B2

(12) United States Patent
Feng

(10) Patent No.: US 12,700,393 B2
(45) Date of Patent: Aug. 4, 2026

(54) SYSTEMS AND METHODS FOR SUBBAND VIRTUAL PATH CALCULATION IN ACTIVE NOISE CANCELLATION

(71) Applicant: Harman International Industries, Incorporated, Stamford, CT (US)

(72) Inventor: Tao Feng, Novi, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 188 days.

(21) Appl. No.: 18/612,531

(22) Filed: Mar. 21, 2024

(65) Prior Publication Data

US 2025/0299664 A1 Sep. 25, 2025

(51) Int. Cl.

*A61F 11/06* (2006.01)
*G10K 11/178* (2006.01)
*G10K 11/16* (2006.01)

(52) U.S. Cl.

CPC .. *G10K 11/17854* (2018.01); *G10K 11/17883* (2018.01); *G10K 2210/3025* (2013.01)

(58) Field of Classification Search

CPC ....... G10K 11/17854; G10K 11/17883; G10K 2210/3025
USPC .............................................. 381/71.11, 71.1
See application file for complete search history.

(56) References Cited

U.S. PATENT DOCUMENTS

2016/0163304 A1* 6/2016 Lee .................. G10K 11/17881 381/71.4
2019/0051283 A1 2/2019 Malka et al.

FOREIGN PATENT DOCUMENTS

CN 117292670 A * 12/2023 ....... G10K 11/17854

OTHER PUBLICATIONS

Feng, T. et al., "Active Noise Cancellation System and Method," U.S. Appl. No. 18/305,150, filed Apr. 21, 2023, 61 pages.
Feng, T. et al., "Systems and Methods for Subband Adaptive Filtering for Enhanced Active Noise Cancellation in Vehicles," U.S. Appl. No. 63/627,632, filed Jan. 31, 2024, 44 pages.
Long, G., "Subband Adaptive Filtering for Active Broadband Noise Control with Application to Road Noise Inside Vehicles," Doctor of Philosophy Thesis, College of Engineering and Applied Science, University of Cincinnati, Jun. 2020, 175 pages.
European Patent Office, Extended European Search Report Issued in Application No. 25162547.1, Jul. 15, 2025, Germany, 11 pages.

* cited by examiner

*Primary Examiner* — Ammar T Hamid
(74) *Attorney, Agent, or Firm* — McCoy Russell LLP

(57) ABSTRACT

Methods and systems are disclosed for a vehicle audio system. In one example, a method for noise cancellation in a vehicle having a physical microphone configured to acquire a physical microphone signal, and a plurality of virtual microphones acquiring a residual signal is provided, including processing the physical microphone signal with an adaptive weight filter to estimate a virtual secondary path from the physical microphone to the plurality of virtual microphones, decomposing the residual signal and the physical microphone signal into a plurality of subband signals, determining a subband gradient for each subband, determining a subband virtual path convergence speed based on a normalized step size for each subband, determining a subband virtual path for each subband based on the normalized step size and the subband gradient, and applying a weight transformation process to each subband virtual path to update the adaptive weight filter and verify the subband virtual path.

20 Claims, 5 Drawing Sheets

200

SYSTEMS AND METHODS FOR SUBBAND VIRTUAL PATH CALCULATION IN ACTIVE NOISE CANCELLATION

FIELD

The disclosure relates to a systems and methods for active noise cancellation. In particular, systems and methods for calculating a virtual secondary path for use in active noise cancellation.

BACKGROUND

Active noise cancellation (ANC) technology is a method used to generate sound waves that destructively interfere with undesired sound waves. The destructively interfering sound waves may be produced by a transducer, such as a loudspeaker, to combine with the undesired sound waves. This technology is widely used in various applications, including headphones, residential and commercial buildings, and automotive environments, to create a quieter and more comfortable acoustic experience. In automotive applications, ANC systems are particularly beneficial for reducing road noise, engine noise, and other external sounds that can penetrate the cabin of a vehicle, thereby enhancing the comfort of passengers.

In current automotive applications, virtual microphone technology (VMT) may be used. In an automotive application, it may be desirable to cancel noise in the vicinity of the ears of a driver or passenger but it may be impractical to place a microphone in those locations. The location of one or more virtual microphones may be the areas where noise cancellation is attempted. VMT systems in automotive applications may include one or more physical microphones placed within the vehicle cabin, an algorithm to calculate the soundwaves that may be produced by a transducer, such as a speaker within the vehicle, to create a quiet area in the location of the virtual microphone or microphones. A time-domain least mean squared (LMS) algorithm is commonly used to calculate the virtual path from the physical microphone to the virtual microphone.

However, the inventors herein have recognized potential issues with such systems. A LMS algorithm has inherent limitations when applied to a VMT system. In particular, LMS algorithms are limited when estimating high frequency noise on the passenger or driver's ears, which inhibits high frequency noise cancellation. Additionally, LMS algorithms demand significant computational power to perform effectively, which may increase the amount of space and power computational devices within the vehicle.

SUMMARY

The present application provides systems and methods for subband virtual path calculation that significantly enhances the performance of virtual microphone technology (VMT) in active noise cancellation systems (ANC), particularly in estimating high-frequency noise on ears of a listener. The application discloses an approach including subband adaptive filtering (SAF) that addresses the computational limitations of traditional VMT systems and increases accuracy of the virtual path calculation over a wide frequency range.

In a first aspect, a method for noise cancellation in a vehicle having a physical microphone configured to acquire a physical microphone signal correlated to a filtered noise signal within a vehicle cabin, and a plurality of virtual microphones positioned within the vehicle cabins acquiring a residual signal is provided. The method includes processing the physical microphone signal with an adaptive weight filter to estimate a virtual secondary path from the physical microphone to the plurality of virtual microphones. The method includes applying a set of analysis filters to decompose the residual signal into a plurality of subband error signals and to decompose the physical microphone signal into a plurality of subband physical microphone signals. The method includes determining a subband gradient for each subband based on a subband physical microphone signal and a subband error signal and determining a subband virtual path convergence speed based on a normalized step size for each subband. The method includes determining a subband virtual path for each subband based on the normalized step size and the subband gradient. The method includes applying a subband weight transformation process to each subband virtual path to update the adaptive weight filter and verify the subband virtual path.

In a second aspect, a noise cancellation system for a vehicle, includes a physical microphone configured to acquire a physical microphone signal correlated to a filtered noise signal within a vehicle cabin and a plurality of virtual microphones positioned within the vehicle cabin and configured to acquire a residual signal. The system includes an adaptive weight filter in electronic communication with the physical microphone signal, configured to apply an adaptive filtering process to the physical microphone signal to estimate a virtual secondary path from the physical microphone to the plurality of virtual microphones. The system includes a signal processing unit in electronic communication with the physical microphone and the plurality of virtual microphones, wherein the signal processing unit comprises, a non-transitory memory storing a set of analysis filters, and instructions, and a processor. When executing the instructions, the processor is configured to apply the set of subband analysis filters to decompose the residual signal into a plurality of subband error signals and to decompose the physical microphone signal into a plurality of subband physical microphone signals, determine a subband gradient for each subband based on a subband physical microphone signal and a subband error signal, determine a subband virtual path convergence speed based on a normalized step size for each subband, determine a subband virtual path for each subband based on the normalized step size and the subband gradient, and apply a subband weight transformation process to each subband virtual path to update the adaptive weight filter and verify the subband virtual path.

In another aspect, a method includes acquiring a physical microphone signal using a physical microphone sensor, wherein the physical microphone signal is correlated with a filtered noise signal in a vehicle cabin. The method includes processing the physical microphone signal with an adaptive weight filter to estimate a virtual secondary path from the physical error microphone to a plurality of virtual error microphones. The method includes acquiring a residual signal from the plurality of virtual error microphones positioned in the vehicle cabin. The method includes decomposing the physical microphone signal and the residual signal into a plurality of subband signals. The method includes calculating a subband gradient for each subband based on a decomposed physical signal and a decomposed residual signal. The method includes calculating a normalized step size for each subband based on a power contribution of the physical microphone signal. The method includes updating a set of subband virtual path weights based on the subband gradient and the normalized step size and weight transforming the updated set of subband virtual path weights to a time domain using an Inverse Fast Fourier Transform (IFFT). The method includes processing the residual signal based on the transformed subband virtual weights to reduce noise in the vehicle cabin.

In this way, virtual path calculation accuracy is increased with reduced computational complexity.

BRIEF DESCRIPTION OF THE DRAWINGS

The disclosure may be better understood from reading the following description of non-limiting embodiments, with reference to the attached drawings, wherein below.

DETAILED DESCRIPTION

In one of many exemplary embodiments, an active noise cancellation (ANC) system as described herein may reduce undesired sound present in an environment. Undesired sound is any sound that is annoying to a listener such as vehicle engine sound, road noise etc., but it can also be music or speech of others when, for example, the listener wants to make a telephone call. The disclosed system and methods include a VMT system that uses subband adaptive filtering (SAF) to calculate the virtual path from the physical microphone to the virtual microphone. The VMT system may include one or more microphones within the cabin of a vehicle capable of measuring the sound within a vehicle cabin. The measured sound within the vehicle may then be processed and an algorithm may be applied to it to calculate the sound at a location of interest, such as the ears of the driver or passenger.

Figure 1:
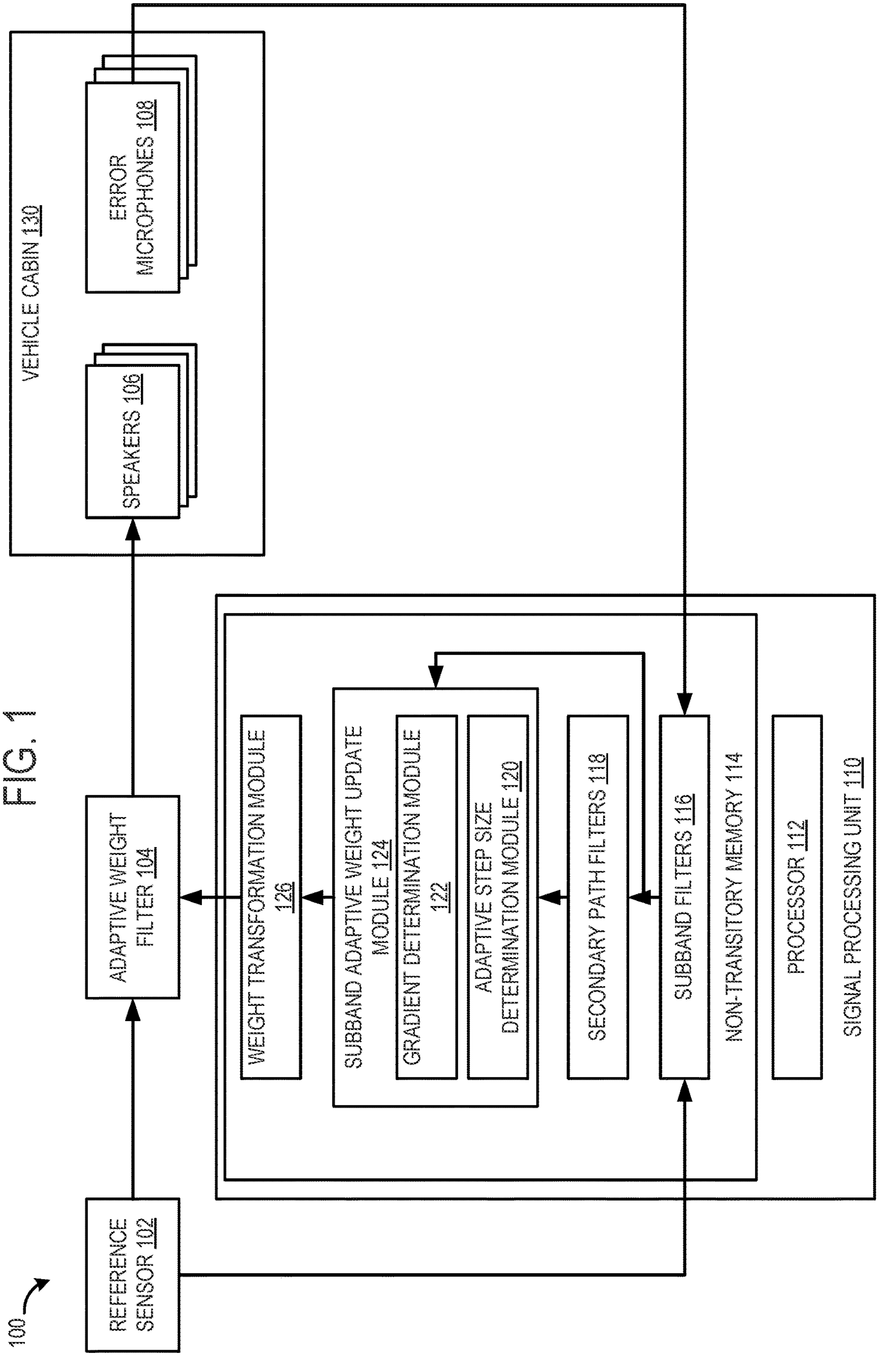
FIG. 1 illustrates a schematic diagram of an active noise cancelling system, according to one or more embodiments of the current disclosure.
Figure 2:
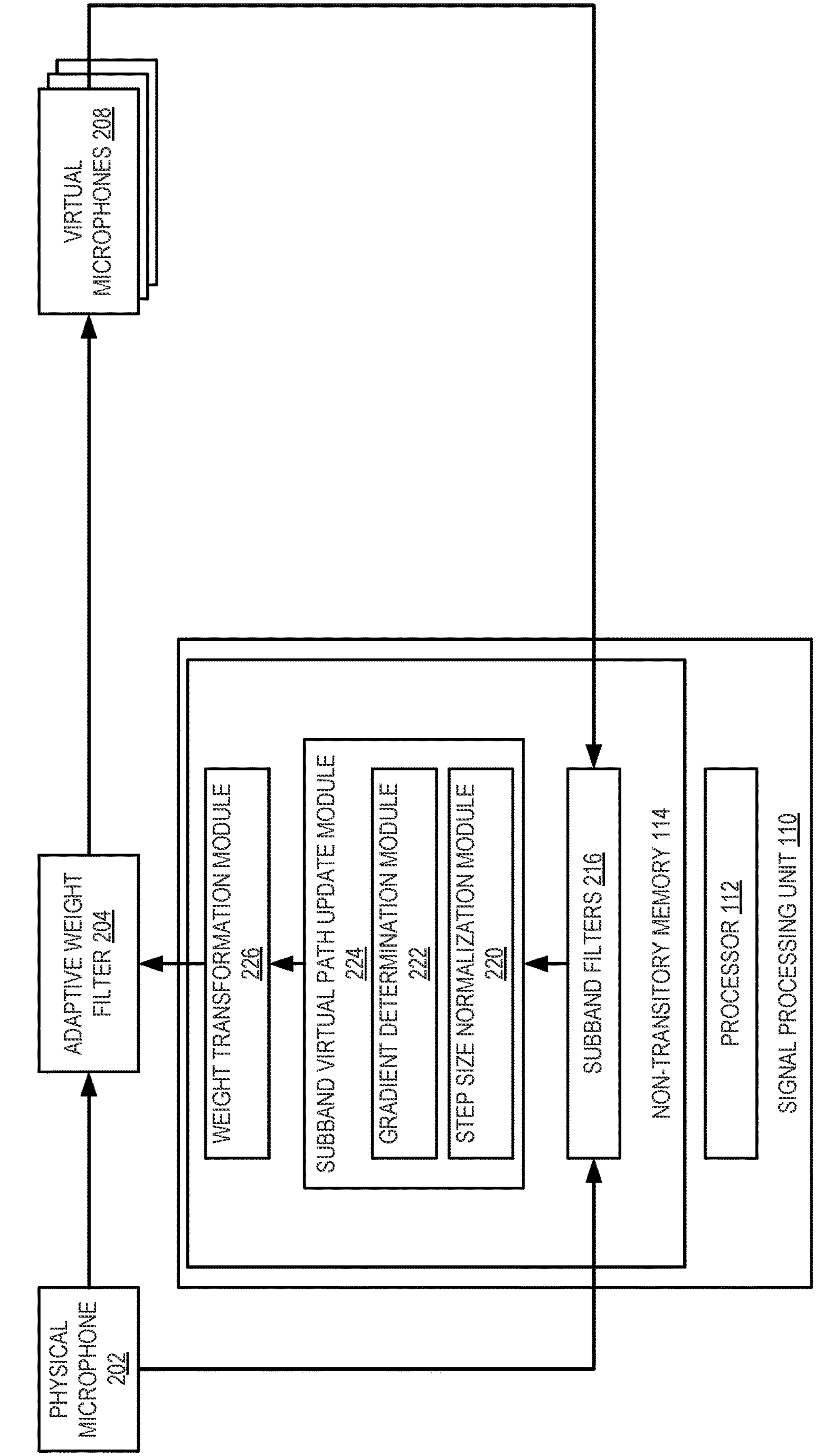
FIG. 2 illustrates a schematic diagram of a virtual path calculation system, according to one or more embodiments of the current disclosure.
Figure 3:
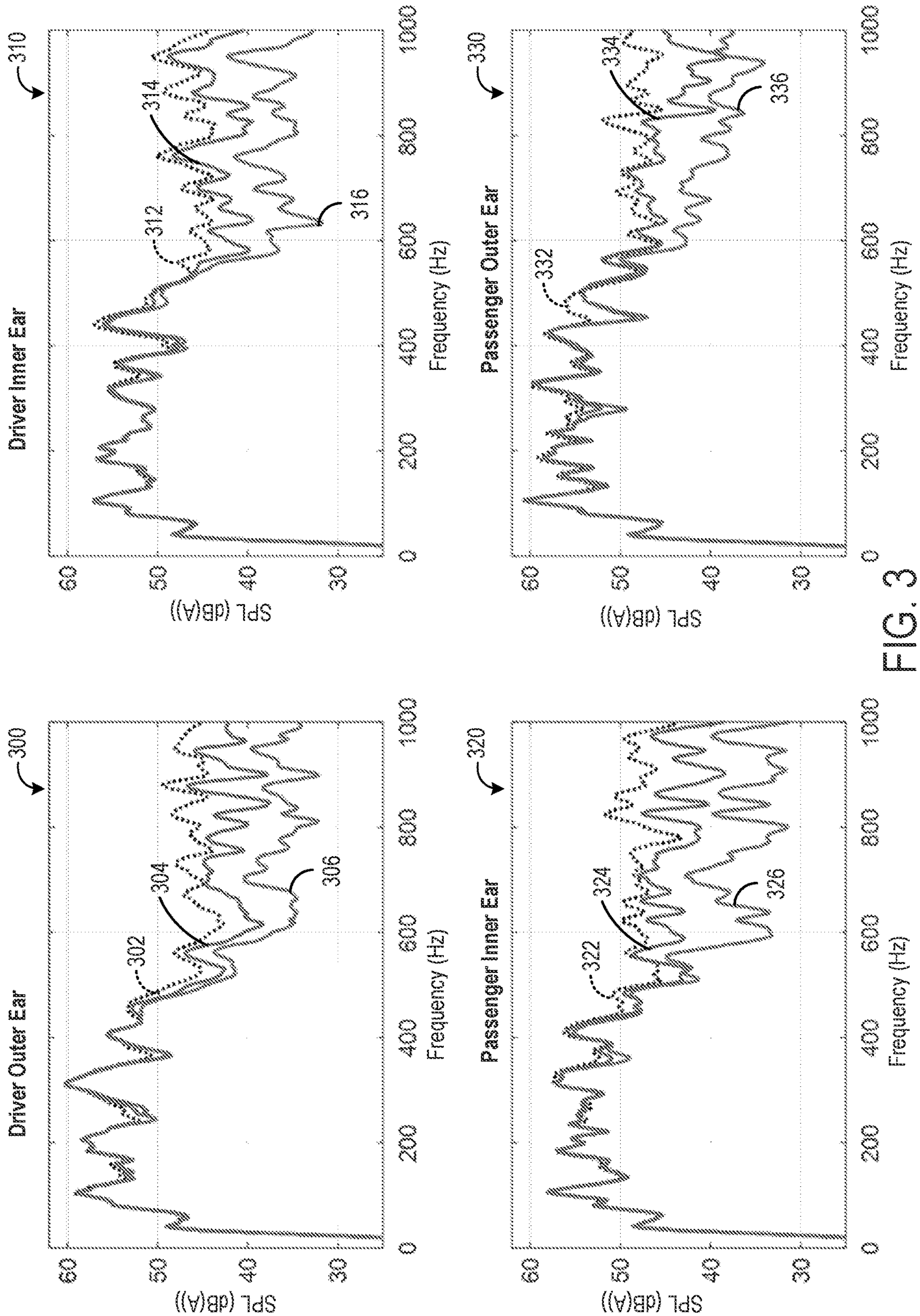
FIG. 3 is a graph showing a performance comparison between the traditional time-domain least mean squared algorithm and the proposed subband virtual path calculation, according to one or more embodiments of the current disclosure.
Figure 4:
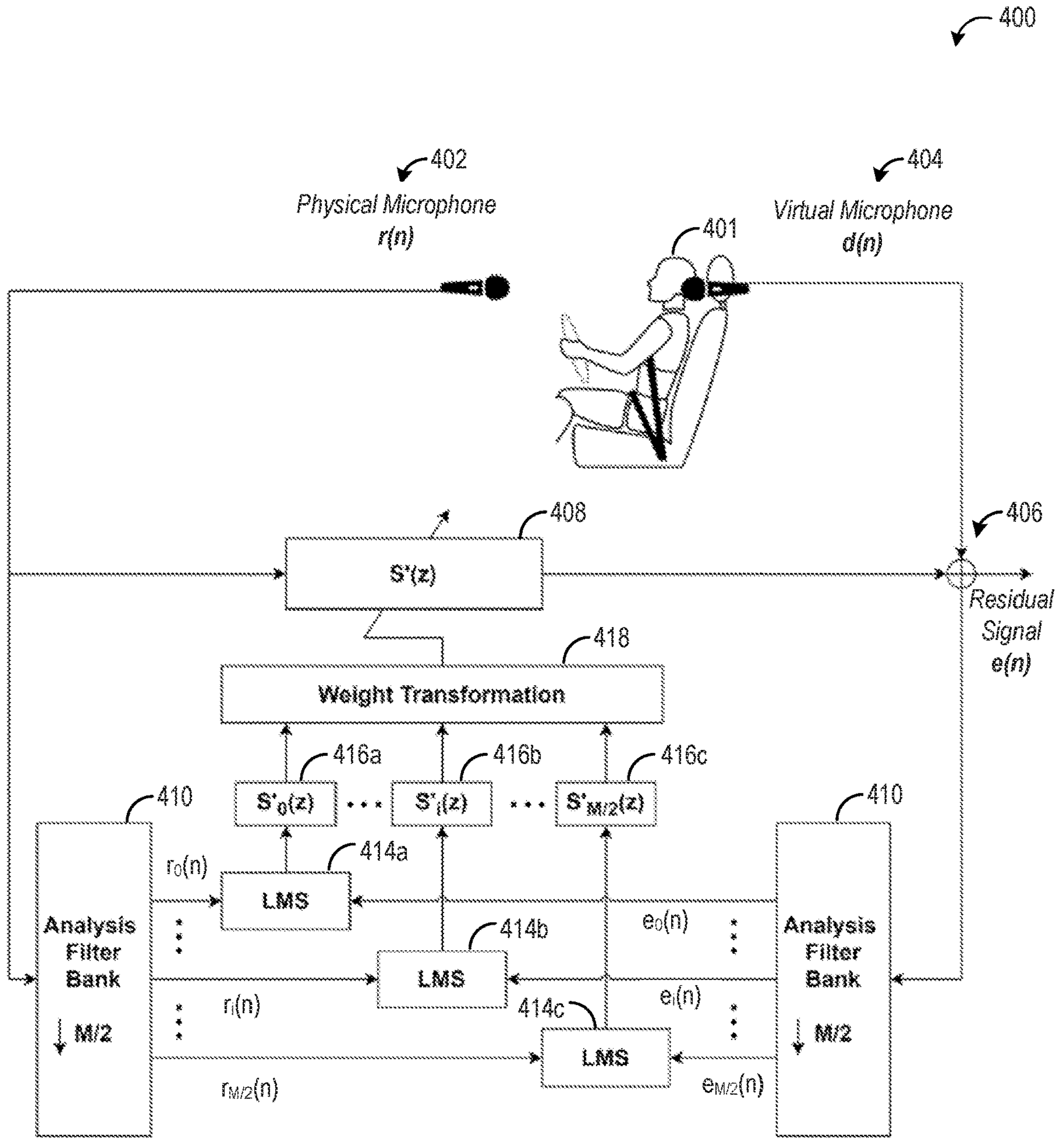
FIG. 4 shows a schematic of a Subband Virtual Path Algorithm, according to one or more embodiments of the present disclosure.
Figure 5:
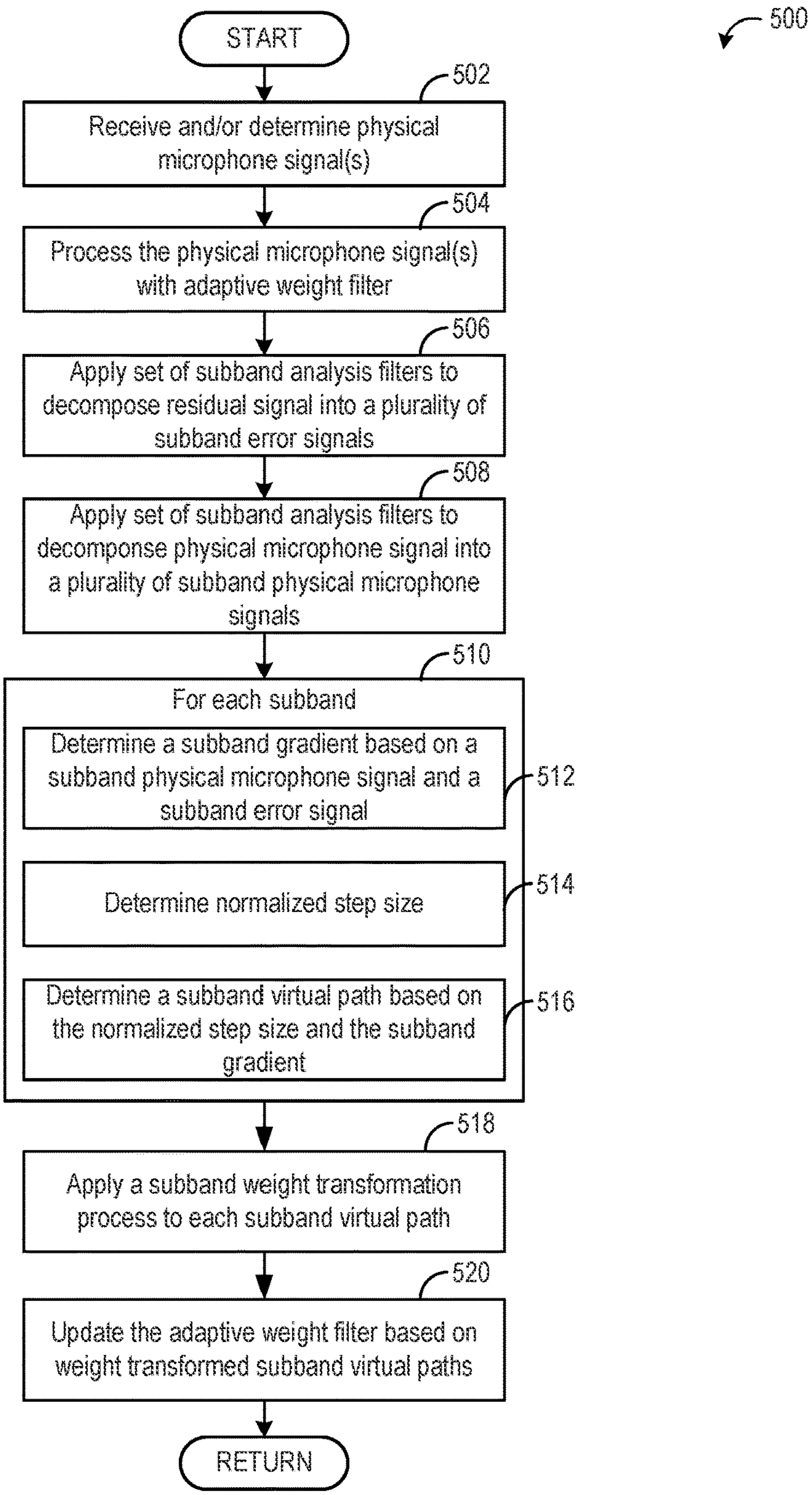
FIG. 5 shows a flow chart illustrating a method for calculating a virtual secondary path from a physical microphone to a virtual microphone in accordance with one or more embodiments of the present disclosure.

The figures below may display aspects of the system and methods claimed herein. FIG. 1 is a schematic diagram of a noise cancellation system. The noise cancellation system may contain a plurality of error microphones, processors, and speakers capable of detecting ambient noise within a vehicle cabin, processing the ambient noise to determine a signal to output to the speakers that cancels the ambient noise in the vehicle cabin. FIG. 2 is a schematic diagram of a virtual path calculation system. One embodiment of a noise cancellation system in a vehicle involves the use of virtual microphones, where noise cancellation may be focused on a position where there are no physical microphones and the position may be referred to as the location of a virtual microphone. In this case, the noise detected by physical microphones within the cabin may be processed to predict the sound at the location of a virtual microphone. The predicted sound at the location of the virtual microphone may be used to determine the signal that the speakers produce to cancel noise at the location of the virtual microphone, and may be used to determine the remaining noise at the location of the virtual microphone after noise cancellation has been performed. The virtual path may be the process applied to the noise detected by physical microphones within the system to calculate the noise at the location of the virtual microphone. The virtual path may be calculated by a signal processing unit and it may be accomplished with a subband adaptive filter. FIG. 3 is a graph that compares the a recorded sound signal to the estimated signal produced by a traditional least mean squared method and the proposed subband virtual path algorithm at different frequencies. FIG. 4 is a schematic representation of the subband virtual path algorithm. It shows the process of transferring a sound collected from a physical microphone to a sound at received at a virtual microphone. Additionally, it displays how the according the subband virtual processing algorithm the measured sound signal is split into subbands that are each processed individually to calculate the virtual path. FIG. 5 is a flowchart that describes the virtual path algorithm schematically depicted in FIG. 4.

Turning to FIG. 1, it shows a block diagram of a vehicle noise cancelling system 100. The vehicle noise cancelling system 100 is configured to enhance the acoustic environment within a vehicle cabin 130 by actively reducing unwanted noise. The vehicle noise cancelling system 100 is equipped with a reference sensor 102, which is tasked with acquiring a reference signal that correlates with the noise present within the vehicle cabin 130. This reference signal serves as the basis for generating a noise cancellation signal that counteracts the detected noise.

The vehicle noise cancelling system 100 comprises an adaptive weight filter 104, which processes the reference signal obtained by the reference sensor 102 and applies an adaptive filtering algorithm to produce the noise cancellation signal. The adaptive weight filter 104 is capable of adjusting its filtering characteristics dynamically to reduce a residual signal acquired via a plurality of error microphones 108.

The vehicle noise cancelling system 100 includes a plurality of speakers 106 strategically positioned within the vehicle cabin 130. The speakers 106 are configured to emit the noise cancellation signal into the cabin space, thereby creating an anti-noise sound field that interferes with the unwanted noise to reduce or eliminate it.

To monitor the effectiveness of the noise cancellation process, a plurality of error microphones 108 are also positioned within the vehicle cabin 130. In one example, the plurality of error microphones 108 may include one or more physical error microphones and one or more virtual error microphones, which are described in more detail with reference to FIG. 2. These error microphones 108 capture the residual signal, which is the resultant sound after the interaction of the emitted noise cancellation signal with the original noise. The residual signal provides feedback on the performance of the vehicle noise cancelling system 100. For example, reducing the residual signal captured by the plurality of error microphones may indicate greater effectiveness of the noise cancellation process.

A signal processing unit 110 serves as the computational hub of the vehicle noise cancelling system 100. The signal processing unit 110 is in electronic communication with both the reference sensor 102 and the error microphones 108. The signal processing unit 110 houses a processor 112 and a non-transitory memory 114, which together execute machine-readable instructions for cancelling noise within vehicle cabin 130. The processor 112 in the signal processing unit 110 is a hardware component designed to execute machine executable instructions stored in non-transitory memory 114, including instructions for computational tasks for real-time signal processing, including adaptive filtering algorithms, subband decomposition, and gradient calculations for filter weights. The processor 112 processes data to generate a real-time noise cancellation signal that counteracts unwanted noise in the vehicle cabin 130.

The non-transitory memory 114 stores machine-readable instructions and data for the vehicle noise cancelling system 100, maintaining this information even when the system is off. It contains firmware, software, and data structures or databases used by the processor 112, and may include ROM, flash memory, or other non-volatile storage technologies. The non-transitory memory 114 also holds historical data and adaptive filter coefficients for system learning and performance enhancement.

The signal processing unit 110 of the vehicle noise cancelling system 100 uses a set of subband filters 116 to decompose audio signals into multiple frequency subbands. The subband filters 116 are designed to divide the broad frequency range of the reference and residual signals into narrower bands, allowing noise cancellation strategies tailored to acoustic properties of each subband. The subband filters 116 start with a prototype lowpass filter, which is then modulated to create a series of bandpass filters covering the entire frequency range of interest.

The impulse response of each subband filter, denoted as $h_m$, is obtained from the prototype filter by a modulation process that shifts the filter's passband to the frequency range of the target subband. The impulse response for the $m^{th}$ subband filter is determined using a mathematical transformation that includes the effects of modulation and windowing. The number of subbands, M, and the length of each subband filter, $l_{sw}$, are parameters that affect the resolution and computational demands of the subband filtering process. The subband filters 116 are utilized on the reference and residual signals through filter bank analysis. This involves convolving the input signals with the impulse responses of each subband filter to isolate the subband components. The outputs are sets of subband reference signals and subband error signals, which reflect the frequency content of the original signals within each subband. By operating in the subband domain, the vehicle noise cancelling system 100 can more effectively execute the noise cancellation task by focusing on and canceling specific frequencies of sound.

Secondary path filters 118 are applied to the subband reference signals to produce filtered subband reference signals. These secondary path filters 118 model the acoustic transfer function from the speakers 106 to the error microphones 108 within each subband. These filters reflect the characteristics of the vehicle cabin's acoustic environment, which includes cabin geometry, upholstery materials, and the variable presence of passengers or cargo. Each secondary path filter in secondary path filters 118 corresponds to a particular subband and processes the associated subband reference signal, taking into account the frequency-dependent behavior of sound transmission, including reflection, absorption, and diffraction. The secondary path filters may be learned in a secondary path calibration process, as previously disclosed. To maintain accuracy, the system may include a calibration mechanism that adjusts filter coefficients in response to environmental changes.

An adaptive step size determination module 120 is included in the signal processing unit 110. The adaptive step size determination module 120 adjusts the step size in the adaptive filtering algorithm of the vehicle noise cancelling system 100 on a per subband basis. This adjustment affects the convergence rate and stability of the adaptive filter weights within the adaptive weight filter 104. The adaptive step size determination module dynamically modifies the step size in each subband based on the power contribution of the error microphone signals and the reference signals within each respective subband, which affects convergence speed and stability of the adaptive filter weights. The adaptive step size determination module 120 calculates a normalized step size for each subband by evaluating factors such as the sum power of the filtered reference signal and the error signal, the individual power contributions of these signals, and a smoothness parameter related to their power. The module may also consider a power contribution parameter reflecting the maximum power within each subband. The resulting normalized step size is then applied to update the subband adaptive filter weights, seeking to balance between convergence speed and stability.

Gradient determination module 122 calculates the subband gradient for each subband based on the filtered subband reference signals and the corresponding subband error signals. This continuous real-time adjustment allows the vehicle noise cancelling system 100 to adapt effectively to varying noise conditions, improving the acoustic experience inside the vehicle cabin.

Subband adaptive weight update module 124 updates the adaptive filter weights in each subband based on the calculated gradients and the determined adaptive step sizes. The subband adaptive weight update module 124 ensures that the vehicle noise cancelling system 100 adapts in real-time to the noise conditions within the vehicle cabin 130.

Weight transformation module 126 integrates the updated adaptive filter weights from each subband to produce the final weights for the adaptive weight filter 104 in the time domain. These updated weights are then applied to the adaptive weight filter 104 to adjust the noise cancellation signal for optimal noise reduction within the vehicle cabin 130.

FIG. 2 shows a block diagram of a virtual path calculation system 200. The virtual path calculation system 200 is configured reduce interior noise around ears of a driver or a passenger, regardless of error microphone placement. In one example, the virtual path calculation system 200 may be included in the vehicle noise cancelling system 100 as part of the overall approach to reduce unwanted noise, e.g., road noise, within the vehicle cabin 130. The virtual path calculation system 200 includes a physical microphone 202 configured to acquire a physical microphone signal that correlates with a filtered noise signal present within the vehicle cabin 130 in FIG. 1. For example, the physical microphone signal may comprise a residual signal that is the product of filtering road noise by the anti-noise signal produced by a transducer such as the speakers 106 in FIG. 1. The physical microphone signal serves as the basis for estimating a virtual secondary path from the physical microphone 202 to a plurality of virtual microphones 208. The physical microphone 202 and the plurality of virtual microphones 208 may be a non-limiting example of the error microphones 108 included in the vehicle noise cancelling system 100 in FIG. 1.

Virtual path calculation system 200 comprises an adaptive weight filter 204, which processes the physical microphone signal obtained by the physical microphone 202 and applies a subband virtual path (SVP) algorithm to calculate the transfer function from the physical microphone 202 and the plurality of virtual microphones 208, e.g., the virtual secondary path. Similar to the adaptive weight filter 104, the adaptive weight filter 204 is configured to adjust of filtering characteristics to reduce the residual signal acquired via the plurality of virtual microphones 208.

The virtual path calculation system 200 includes the plurality of virtual microphones 208 virtually positioned within the vehicle cabin 130. In one example, the plurality of virtual microphones 208 may be virtually positioned on vehicle headrests and configured to detect the acoustic environment near ears of a passenger. In one example, the virtual microphones may comprise modeled representations of physical error microphones. The plurality of virtual microphones 208 record the residual signal, which is the resultant sound after the interaction of the emitted noise cancellation signal with the original noise is filtered with the adaptive weight filter 204. The residual signal provides feedback on the performance of the virtual path calculation system 200.

The virtual path calculation system 200 includes the signal processing unit 110 described above with reference to the vehicle noise cancelling system 100, the processor 112, and the non-transitory memory 114, which together execute machine-readable instructions for calculating the virtual secondary path. The signal processing unit 110 is in electronic communication with both the physical microphone 202 and the plurality of virtual microphones 208. In addition to executing the machine executable instructions described with reference to FIG. 1, the processor 112 may execute subband virtual path calculation algorithms. The processor 112 processes data to estimate the transfer function from the physical microphone 202 to the virtual microphones 208 for targeted noise reduction near ears of passengers in the vehicle cabin 130.

A set of subband filters 216 in the signal processing unit 110 of the virtual path calculation system 200 is used in the decomposition of audio signals into multiple frequency subbands. Similar to the subband filters 116 described above with reference to the vehicle noise cancelling system 100, the subband filters 216 are designed to divide the broad frequency range of the physical microphone signals and residual signals into narrower frequency bands. Each subband filter within the set corresponds to a distinct frequency range within a residual noise spectrum within the vehicle cabin, enabling the system to estimate the virtual secondary path of each subband. The design of the subband filters 216 includes a prototype filter, generally a lowpass filter with a particular window function. The selection of the window function, such as Hamming or Kaiser, may depend on a predetermined frequency response characteristic for each subband. This prototype filter is then modulated to create a series of bandpass filters that span the entire frequency range of interest.

As described above with reference to FIG. 1, the impulse response of each subband filter is obtained from the prototype filter, and the resolution and computational demands of the subband filtering process may be adjusted by adjusting the length and number of subband filters. The subband filters 216 are used on the physical microphone and residual signals through filter bank analysis, as introduced above and described in more detail with reference to FIG. 3. The outputs are sets of subband physical microphone signals and subband error signal, which include the frequency content of the original signals within each subband. Virtual path calculation is performed in the subband domain on the subband physical microphone signals and subband error signals. This approach reduces the computational demands compared to full-band processing and increases the accuracy in calculating the virtual path in varying noise conditions within the vehicle cabin 130.

A step size normalization module 220 is included in the signal processing unit 110. The step size normalization module 220 adjusts the step size in the subband virtual path algorithm of the virtual path calculation system 200 on a per subband basis. This adjustment affects the convergence rate and stability of the filter weights within the adaptive weight filter 204. The step size normalization module 220 dynamically modifies the step size in each subband based on the power contribution of the error microphone signals and the physical microphone signals within each respective subband, in similar approach as the adaptive step size determination module 120 in FIG. 2, and described in more detail below with reference to FIG. 3. The resulting normalized step size is implemented for updating the subband virtual path of each subband. This continuous real-time adjustment allows the virtual path calculation system 200 to adapt effectively to varying noise conditions in the vehicle cabin.

A gradient determination module 222 calculates the subband gradient for each subband based on the filtered subband physical microphone signals and the corresponding subband error signals. The output of the gradient determination module 122 is used for adjusting the subband virtual path calculation in each subband to minimize the residual signal.

A subband virtual path update module 224 updates the subband virtual path in each subband based on the calculated gradients and the determined normalized step sizes. The subband virtual path update module 224 adapts the virtual path calculation system 200 to the real-time noise conditions within the vehicle cabin 130.

A weight transformation module 226 integrates the updated subband virtual path from each subband to produce an estimated virtual secondary path for the adaptive weight filter 204 in the time domain. The updated subband virtual paths are then applied to the adaptive weight filter 204 to model the transfer function from the physical microphone 202 to the plurality of virtual microphones 208 for targeted noise reduction within the vehicle cabin 130.

FIG. 3 shows plots 300, 310, 320, 330 depicting simulation results of a performance comparison between a conventional time domain LMS algorithm and the disclosed subband virtual path (SVP) algorithm to estimate a real virtual microphone signal. With reference the plots 300, 310, 320, 330, the real virtual microphone signal is referred to as a target virtual secondary path. The SVP algorithm shows increases in accuracy and performance, compared to the conventional approach.

In each plot, frequency in Hz is plotted on the x-axis and sound pressure level (SPL) in dB(A) is plotted on the y-axis. Plot 300 shows a target virtual secondary path 302 on a driver outer ear, a first virtual secondary path 304 estimated by the disclosed SVP algorithm, and a second virtual secondary path 306 estimated by the traditional LMS algorithm. Plot 310 shows a target virtual secondary path 312 on a driver inner ear, a first virtual secondary path 314 estimated by the disclosed SVP algorithm, and a second virtual secondary path 316 estimated by the traditional LMS algorithm. Plot 320 shows a target virtual secondary path 322 on a passenger outer ear, a first virtual secondary path 324 estimated by the disclosed SVP algorithm, and a second virtual secondary path 326 estimated by the traditional LMS algorithm. Plot 330 shows a target virtual secondary path 332 on a passenger outer ear, a first virtual secondary path 334 estimated by the disclosed SVP algorithm, and a second virtual secondary path 336 estimated by the traditional LMS algorithm.

To enhance the overall performance and reliability of a noise cancellation system and virtual microphone technology performance, the closer the estimated virtual microphone signal is to the real virtual microphone signal, the better noise cancellation performance the system achieves. As shown in the plots 300, 310, 320, 330, the virtual secondary path estimated by the SVP algorithm (e.g., paths 304, 314, 324, 334) is closer to the real virtual microphone signal (e.g., paths 302, 312, 322, 332). This is especially noticeable in the high-frequency range, with an overall accuracy of 4.6 dB, shown across the plots 300, 310, 320, 330. Meanwhile, the SVP algorithm may reduce power consumption and computational operations for a noise reduction system, relative to a traditional LMS algorithm FIG. 4 is a block diagram illustrating a subband virtual path (SVP) system 400 using subband adaptive filtering (SAF) to estimate a virtual secondary path in either an online or an offline process. In one example, the SVP system 400 is used in a Single Input Multiple Output (SIMO) system to estimate a transfer function from one physical microphone to multiple virtual microphone. The SVP system 400 may be the same or similar to the SVP system 200 described with reference to FIG. 1. In one example, the SVP system 400 may be implemented in a noise cancelling system of a vehicle, such as the vehicle noise cancelling system 100 described with reference to FIG. 1. Signal paths are depicted in the diagram by a line with an arrow indicating a direction of signal transfer.

The SVP system 400 includes a physical microphone 402 configured to acquire a physical microphone signal and a plurality of virtual microphones 404 acquiring a residual signal 406. In some examples, the physical microphone 402 may include more than one physical microphone or a plurality of physical microphones. The plurality of virtual microphones 404 are virtually positioned near ears of a listener 401 to detect an acoustic environment thereabout. The listener 401 may include a passenger inside a vehicle cabin, such as the vehicle cabin 130. The SVP system 400 includes a virtual secondary path 408. The virtual secondary path 408 comprises an adaptive filter representing the transfer function from the physical microphone 402 to the plurality of virtual microphones 404.

To obtain the residual signal e(n), it is expressed as:

$$e_j(n) = d_j(n) - \sum_{l=0}^{l_w-1} S'_j(l) * r(n-l)$$

where $e_j(n)$ is the residual signal of the $j^{th}$ error microphone, $S'_j$ is the estimated impulse response by the SVP algorithm from selected physical microphone to $j^{th}$ virtual error microphone, r (n) is the physical microphone signal, $l_w$ is the length of the full adaptive filter, and * is the linear convolution operator. In other words, the residual signal is obtained by linear convolution of the primary signal on the physical microphone, the estimated impulse response from the physical microphone to the plurality of virtual microphones, and the full adaptive filter.

For the subband virtual path calculation, a set of subband analysis filters are used to break down or partition the input signal into individual subbands, each subband representing a different frequency range. In one example, the set of subband analysis filters comprises analysis filter bank 410. In one example, the analysis filter bank comprises a plurality of subband filters. Each subband analysis filter of the analysis filter bank 410 is derived from prototype filter $h_0$ using a window-based lowpass filter. Depending on the intended purpose, different window functions are chosen for the prototype filter design, such as the Hamming or Kaiser windows. To generate the subband analysis filter, it may be calculated by the following equation, $$h_m(i) = h_0 e^{-\left(\frac{j2\pi n}{N}\right)i}$$

where $h_m$ is the impulse response of the $m^{th}$ subband filter, M is the number of subbands, and i is $i^{th}$ coefficient of $h_m$, i=0, 1, . . . , $l_{sW}$, and $l_{sW}$ is the length of the subband analysis filter. In other words, the subband analysis filter is calculated by a prototype linear-phase FIR lowpass filter via complex modulation.

To calculate the subband physical microphone signal $r_m$ and subband error signal $e_{j,m}$, signal subband and decomposition process is conducted. This process allows for the calculation of the subband physical microphone signal, which may be as follows:

$$r_m(\kappa) = \sum_{l=0}^{l_{sW}-1} h_m(l) r(\kappa D - l)$$

$$e_{j,m}(\kappa) = \sum_{l=0}^{l_{sW}-1} h_m(i) e_j(\kappa D - l)$$

$$\kappa = (n-1)/D$$

where $r_m(\kappa)$ is the $m^{th}$ subband physical microphone signal, $e_{j,m}(\kappa)$ is the $m^{th}$ subband error signal of the $j^{th}$ virtual error microphone channel, $h_m$ is the impulse response of the $m^{th}$ subband analysis filter, κ is the subband index, n is the iteration, D is the decimation factor, $L_{sW}$ is the length of the subband adaptive filter. In other words, the signal subband and decomposition process uses the analysis filter bank to determine the number of subband signals and the signal precision.

Further, based on the subband physical microphone signal $r_m$ and subband error signal $e_{j,m}$, the subband gradient $G_{j,m}$ may be calculated as, $$G_{j,m}(\kappa) = r_m^*(\kappa) e_{j,m}(\kappa)$$

where $G_{j,m}$ (κ) is the $m^{th}$ subband gradient of the $j^{th}$ error microphone channel, $r^*_m(\kappa)$ is the complex conjugate of the $m^{th}$ subband physical microphone signal. In other words, the subband gradient calculation, indicated by blocks 414*a*, 414*b*, 414*c*, includes performing a complex conjugate multiplication of the subband physical microphone signal and the subband error signal. The subband adaptive filter in each subband is adjusted based on each subband gradient calculation, which is a part of a subband LMS process.

To adjust the subband secondary path convergence speed, a simple subband step size normalization method is applied, which is only based on the power contribution of the subband virtual microphone signal to adjust the step size. The normalized step size $U_m$ may be calculated in the following equation:

$$U_m(\kappa) = \frac{\mu}{r_m(\kappa) r_m^*(\kappa) + \alpha}$$

where $U_m(\kappa)$ is the normalized step size of the $m^{th}$ subband, $r_m(\kappa)$ is the $m^{th}$ subband physical microphone signal, and $\alpha$ is the constant value. In other words, the step size normalization process ensures different subband signal levels converge at a uniform rate. The constant value may be adjusted based on a desired step size to avoid too small or too large of step sizes. For example, the constant value may be adjusted based on a threshold normalized step size, so that the normalized step size obtained by the calculation exceeds the threshold normalized step size, or falls within a threshold range, which may otherwise affect system stability. In one example, the threshold normalized step size may be non-zero, positive value threshold. The value may be determined via calibration operation.

Hence, subband virtual path $s'_{j,m}$ is calculated and updated in the subband adaptive filter weight update equation, which is based on the subband gradient $G_{j,m}$ and the normalized step size $U_m$ in the following equation:

$$s'_{j,m}(\kappa+1) = \gamma_m s'_{j,m}(\kappa) + U_m(\kappa) G_{j,m}(\kappa)$$

where $s'_{j,m}(\kappa)$ is the $m^{th}$ estimated subband virtual path of the $j^{th}$ error microphone channel, $U_m(\kappa)$ is the normalized step size of the $m^{th}$ subband, and $\gamma_m$ is the leakage of the $m^{th}$ subband to avoid the impact noise or transit noise affected. In other words, each subband virtual path, indicated by blocks 416*a*, 416*b*, 416*c*, is calculated and updated by the subband adaptive filter weight update process to estimate the subband virtual path.

To obtain the time-domain estimated virtual secondary path and verify the subband virtual path, the SVP system 400 applies a subband weight transformation process 418, which transfers all subband virtual paths $s'_{j,m}$ to full-length estimated secondary paths $s'_j$ in the following equations:

$$S'_{j,m} = FFT\left(s'_{j,m}, 2 \times L_{sW}\right)$$

$$F_j(f) = S'_{j,\frac{fM}{4l_{sW}}}\left(f\frac{8l_{sW}}{M}\right) \quad f \in [0, 2l_{sW})$$

$$F_j(f) = 0 \quad f = 2l_{sW}$$

$$F_j(f) = F_j(2l_{sW} - f)^* \quad f \in (2l_{sW}, 4l_{sW}]$$

$$s'_j = IFFT(F_j)$$

$$s'_j = s'_j\left(1{:}\ l_W\right)$$

where $S'_{j,m}$ is the $m^{th}$ frequency-domain subband virtual path of the $j^{th}$ error microphone, $F_j(f)$ is the $f^{th}$ frequency bin of the $j^{th}$ error microphone channel, $l_{sW}$ is the length of the subband virtual path, M is the number of subbands, $(\ )^*$ is the complex conjugate, and s'; is the full length estimated virtual path. In other words, the time-domain estimated virtual secondary path calculation includes applying an inverse fast Fourier transformation of the frequency-domain subband virtual path to obtain the adaptive weight filter in the time-domain.

FIG. 5 is a flow chart of a method 500 for calculating a virtual secondary path from a physical microphone to a virtual microphone as part of a vehicle noise cancelling system. The method may be the same or similar to the approach described with reference to the virtual path calculation system 200 that may be included in the vehicle noise cancelling system 100 respectively described in FIG. 2 and FIG. 1. Instructions for carrying out the method 500 may be executed by a controller based on computer readable instructions stored on a memory of the controller and in conjunction with signals received from sensors of the vehicle system, such as the signal processing unit 110, the processor 112, the non-transitory memory 114, the physical microphone 202, the plurality of virtual microphones 208, and the set of subband filters 216 described above with reference to FIG. 1 and FIG. 2. The controller may employ actuators of the vehicle system, such as the plurality of speakers, to adjust vehicle system operation, according to the methods described below.

At 502, the method 500 may include receiving or determining physical microphone signals. There may be one or more physical microphones placed within the cabin of the vehicle that are capable of recording the ambient sound in the cabin of the vehicle at the position of the microphone.

At 504, the method 500 may include processing the signal from the physical microphone(s) with an adaptive weight filter. Applying the adaptive weight filter to the signal from the physical microphone may estimate a virtual path from the physical microphone signal to the virtual microphone(s). A noise cancellation signal may be emitted by a plurality of speakers or transducers within the vehicle cabin in an attempt to cancel the sound within the vehicle cabin. The noise cancellation signal may be based on the virtual path between the physical microphone and the virtual microphones. The characteristics of the adaptive weight filter may be iteratively updated to minimize the residual sound acquired at the location of the plurality of virtual microphones. The residual sound is the sound that may be detected at the locations of the virtual microphones after active noise cancellation has been performed on physical microphone signals using the adaptive weight filter.

At 506, the method 500 may include decomposing the residual signal into a plurality of subband error signals by applying a set of subband analysis filters. The subband analysis filters may separate the residual signal into separate subbands based on frequency. In some examples low pass and high pass filters may be used to decompose the residual signal into a plurality of frequency subbands. Separating the residual signal into a plurality of frequency subbands allows an error signal to be associated with each subband.

At 508, the physical microphone signal may be decomposed into a plurality of subband physical microphone signals by applying a set of subband analysis filters to the physical microphone signal. The subband analysis filters may separate the physical microphone signal into the same frequency subbands that the residual signal is separated into, and the separation may similarly be accomplished by high pass and low pass filters. Using the same frequency subbands at 506 and 508 ensures that each subband physical microphone signal has a corresponding subband error signal.

At 510, a process may be applied to each subband individually from the other subbands to determine the subband virtual path for each individual subband. The submethods within 510 may be applied to each subband created by the subband analysis filters at 506 and 508 before the method continues past 510.

Within 510, at 512, the method 500 includes determining the subband gradient based on a subband physical microphone signal and a subband error signal that share the same subband. The subband gradient may provide information on how the weights of the adaptive weight filter can be adjusted to reduce the subband signal error.

At 514, the method 500 may include determining the normalized step size based on the power contribution of the subband reference signal. The normalized step size may be adjusted from a previously determined step size based on the power contribution of the subband reference signal. The normalized step size may influence the convergence rate and stability of the adaptive filter weights and it may be advantageous to balance the normalized step size so that the adaptive filter weights converge quickly but do not change too drastically between each update.

At 516, the subband secondary virtual path may be updated based on the normalized step size and the gradient. The subband virtual path may be updated according to the methods described with respect to FIG. 4 and may depend on the previous iteration of the subband secondary virtual path, the subband gradient, the normalized step size and the leakage of the subband adaptive filter weight. The leakage of the subband may represent the degree to which the previous iteration of the secondary subband virtual path influences the updated subband secondary virtual path to limit the transit noise effect.

At 518, the method 500 may include applying a subband weight transformation to each subband virtual path. This may include transforming each subband secondary path into the frequency domain using a fast Fourier transform, binning the frequency domain subband secondary virtual path into a plurality of bins based on the error channels of a plurality of error microphones. Applying a weight transformation to each subband virtual path allows the subband to return to the original frequency range to generate a new full-band transfer function.

At 520, the method may further include updating the weights of the adaptive weight filter based on the weight transformed subband secondary virtual paths. The weights may be updated to minimize the residual signal detected at the locations of the virtual microphones.

The present application provides several advantages by applying subband adaptive structure to virtual path calculation. The method calculates the adaptive filter in each subband, which allows for updating the adaptive filter on each frequency range. Further, by using subband signal processing, the method reduces computation power consumption and calculations relative to a traditional least mean squared algorithm (LMS) by focusing resources, such as sound waves for cancelation (e.g., an anti-noise signal), on the frequency bands most affected by residual error. Additionally, the method may be used in different virtual microphone technology or remote microphone technology structures, and may be performed either as an offline or online process. The technical effect of the present application is enhanced virtual microphone performance with less computational resource demand.

The disclosure also provides support for a method for noise cancellation in a vehicle having a physical microphone configured to acquire a physical microphone signal correlated to a filtered noise signal within a vehicle cabin, and a plurality of virtual microphones positioned within the vehicle cabin acquiring a residual signal, the method comprising: processing the physical microphone signal with an adaptive weight filter to estimate a virtual secondary path from the physical microphone to the plurality of virtual microphones, applying a set of analysis filters to decompose the residual signal into a plurality of subband error signals and to decompose the physical microphone signal into a plurality of subband physical microphone signals, determining a subband gradient for each subband based on a subband physical microphone signal and a subband error signal, determining a subband virtual path convergence speed based on a normalized step size for each subband, determining a subband virtual path for each subband based on the normalized step size and the subband gradient, and applying a subband weight transformation process to each subband virtual path to update the adaptive weight filter and verify the subband virtual path. In a first example of the method, the set of analysis filters includes a plurality of subband filters derived from a prototype filter using a window-based lowpass filter, each subband filter corresponding to a distinct frequency range within a residual noise spectrum of the vehicle cabin. In a second example of the method, optionally including the first example, the method further comprises selecting a window function for the prototype filter based on a predetermined frequency response characteristic for each subband. In a third example of the method, optionally including one or both of the first and second examples, determining the normalized step size for each subband is based on a power contribution the subband physical microphone signal and a constant value. In a fourth example of the method, optionally including one or more or each of the first through third examples, the constant value is adjusted based on a threshold normalized step size. In a fifth example of the method, optionally including one or more or each of the first through fourth examples, the subband gradient for each subband comprises performing a complex conjugate multiplication of the subband physical microphone signal and the subband error signal. In a sixth example of the method, optionally including one or more or each of the first through fifth examples, the subband weight transformation process comprises performing a fast Fourier transformation on each subband virtual path to obtain a frequency-domain subband virtual path. In a seventh example of the method, optionally including one or more or each of the first through sixth examples, the subband weight transformation process further comprises applying an inverse fast Fourier transformation to the frequency-domain subband virtual path to obtain the adaptive weight filter in a time-domain. In a eighth example of the method, optionally including one or more or each of the first through seventh examples, the virtual secondary path is a time-domain estimated virtual secondary path.

The disclosure also provides support for a noise cancellation system for a vehicle, comprising: a physical microphone configured to acquire a physical microphone signal correlated to a filtered noise signal within a vehicle cabin, a plurality of virtual microphones positioned within the vehicle cabin and configured to acquire a residual signal, an adaptive weight filter in electronic communication with the physical microphone signal, configured to apply an adaptive filtering process to the physical microphone signal to estimate a virtual secondary path from the physical microphone to the plurality of virtual microphones, and a signal processing unit in electronic communication with the physical microphone and the plurality of virtual microphones, wherein the signal processing unit comprises: a non-transitory memory storing a set of analysis filters, and instructions, and a processor, wherein, when executing the instructions, the processor is configured to: apply the set of subband analysis filters to decompose the residual signal into a plurality of subband error signals and to decompose the physical microphone signal into a plurality of subband physical microphone signals, determine a subband gradient for each subband based on a subband physical microphone signal and a subband error signal, determine a subband virtual path convergence speed based on a normalized step size for each subband, determine a subband virtual path for each subband based on the normalized step size and the subband gradient, and apply a subband weight transformation process to each subband virtual path to update the adaptive weight filter and verify the subband virtual path. In a first example of the system, the set of analysis filters includes a plurality of subband filters derived from a prototype filter using a window-based lowpass filter, each subband filter corresponding to a distinct frequency range within a residual noise spectrum of the vehicle cabin. In a second example of the system, optionally including the first example, the prototype filter comprises a window function, the window function selected based on a predetermined frequency response characteristic for each subband. In a third example of the system, optionally including one or both of the first and second examples, the normalized step size for each subband comprises a power contribution of the subband physical microphone signal and a constant value. In a fourth example of the system, optionally including one or more or each of the first through third examples, the subband gradient for each subband comprises a complex conjugate multiplication of the subband physical microphone signal and the subband error signal. In a fifth example of the system, optionally including one or more or each of the first through fourth examples, the subband weight transformation process comprises a fast Fourier transformation of each subband virtual path to obtain a frequency-domain subband virtual path. In a sixth example of the system, optionally including one or more or each of the first through fifth examples, the subband weight transformation process further comprises an inverse fast Fourier transformation of the frequency-domain subband virtual path to obtain the adaptive weight filter in a time-domain. In a seventh example of the system, optionally including one or more or each of the first through sixth examples, the physical microphone signal comprises a product of filtering road noise by an anti-noise signal produced by a transducer.

The disclosure also provides support for a method comprising: acquiring a physical microphone signal using a physical microphone, wherein the physical microphone signal is correlated with a filtered noise signal in a vehicle cabin, processing the physical microphone signal with an adaptive weight filter to estimate a virtual secondary path from the physical microphone to a plurality of virtual microphones, acquiring a residual signal from the plurality of virtual microphones positioned in the vehicle cabin, decomposing the physical microphone signal and the residual signal into a plurality of subband signals, calculating a subband gradient for each subband based on a decomposed physical signal and a decomposed residual signal, calculating a normalized step size for each subband based on a power contribution of the physical microphone signal, updating a set of subband virtual path weights based on the subband gradient and the normalized step size, weight transforming the updated set of subband virtual path weights to a time domain using an Inverse Fast Fourier Transform (IFFT), and processing the residual signal based on the transformed subband virtual weights to reduce noise in the vehicle cabin. In a first example of the method, the subband gradient for each subband comprises a complex conjugate multiplication of a subband physical microphone signal and a subband error signal. In a second example of the method, optionally including the first example, the decomposing comprises filtering the residual signal and the physical microphone signal through an analysis filter bank comprising a plurality of subband filters, each subband filter corresponding to a distinct frequency range within a residual noise spectrum of the vehicle cabin.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle noise cancelling system 100 and the virtual path calculation system 200, described with reference to FIG. 1 and FIG. 2, respectively. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. An individual step may be omitted in a particular embodiment. The described systems are exemplary in nature, and may include additional elements and/or omit elements. The subject matter of the present disclosure includes all novel and non-obvious combinations and sub-combinations of the various systems and configurations, and other features, functions, and/or properties disclosed. As used herein, "approximately" is construed to mean plus or minus five percent of the range unless otherwise specified.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for noise cancellation in a vehicle having a physical microphone configured to acquire a physical microphone signal correlated to a filtered noise signal within a vehicle cabin, and a plurality of virtual microphones positioned within the vehicle cabin acquiring a residual signal, the method comprising:

processing the physical microphone signal with an adaptive weight filter to estimate a virtual secondary path from the physical microphone to the plurality of virtual microphones;

applying a set of analysis filters to decompose the residual signal into a plurality of subband error signals and to decompose the physical microphone signal into a plurality of subband physical microphone signals;

determining a subband gradient for each subband based on a subband physical microphone signal and a subband error signal;

calculating a normalized step size for each subband, based on a constant value that is adjusted based on a threshold normalized step size, the threshold normalized step size a non-zero, positive value threshold determined via a calibration operation;

determining a subband virtual path convergence speed based on the normalized step size for each subband;

determining a subband virtual path for each subband based on the normalized step size and the subband gradient; and applying a subband weight transformation process to each subband virtual path to update the adaptive weight filter and verify the subband virtual path.

2. The method of claim 1, wherein the set of analysis filters includes a plurality of subband filters derived from a prototype filter using a window-based lowpass filter, each subband filter corresponding to a distinct frequency range within a residual noise spectrum of the vehicle cabin.

3. The method of claim 2, wherein the method further comprises selecting a window function for the prototype filter based on a predetermined frequency response characteristic for each subband.

4. The method of claim 1, wherein determining the normalized step size for each subband is based on a power contribution the subband physical microphone signal.

5. The method of claim 1, wherein the constant value is adjusted to exceed the threshold normalized step size.

6. The method of claim 1, wherein the subband gradient for each subband comprises performing a complex conjugate multiplication of the subband physical microphone signal and the subband error signal.

7. The method of claim 1, wherein the subband weight transformation process comprises performing a fast Fourier transformation on each subband virtual path to obtain a frequency-domain subband virtual path.

8. The method of claim 7, wherein the subband weight transformation process further comprises applying an inverse fast Fourier transformation to the frequency-domain subband virtual path to obtain the adaptive weight filter in a time-domain.

9. The method of claim 1, wherein the virtual secondary path is a time-domain estimated virtual secondary path.

10. A noise cancellation system for a vehicle, comprising:

a physical microphone configured to acquire a physical microphone signal correlated to a filtered noise signal within a vehicle cabin;

a plurality of virtual microphones positioned within the vehicle cabin and configured to acquire a residual signal;

an adaptive weight filter in electronic communication with the physical microphone signal, configured to apply an adaptive filtering process to the physical microphone signal to estimate a virtual secondary path from the physical microphone to the plurality of virtual microphones; and a signal processing unit in electronic communication with the physical microphone and the plurality of virtual microphones, wherein the signal processing unit comprises:

a non-transitory memory storing a set of analysis filters, and instructions; and a processor, wherein, when executing the instructions, the processor is configured to:

apply the set of subband analysis filters to decompose the residual signal into a plurality of subband error signals and to decompose the physical microphone signal into a plurality of subband physical microphone signals;

determine a subband gradient for each subband based on a subband physical microphone signal and a subband error signal;

calculate a normalized step size for each subband, based on a constant value that is adjusted based on a threshold normalized step size, the threshold normalized step size a non-zero, positive value threshold determined via a calibration operation;

determine a subband virtual path convergence speed based on the normalized step size for each subband;

determine a subband virtual path for each subband based on the normalized step size and the subband gradient; and apply a subband weight transformation process to each subband virtual path to update the adaptive weight filter and verify the subband virtual path.

11. The noise cancellation system of claim 10, wherein the set of analysis filters includes a plurality of subband filters derived from a prototype filter using a window-based lowpass filter, each subband filter corresponding to a distinct frequency range within a residual noise spectrum of the vehicle cabin.

12. The noise cancellation system of claim 11, wherein the prototype filter comprises a window function, the window function selected based on a predetermined frequency response characteristic for each subband.

13. The noise cancellation system of claim 10, wherein the normalized step size for each subband comprises a power contribution of the subband physical microphone signal.

14. The noise cancellation system of claim 10, wherein the subband gradient for each subband comprises a complex conjugate multiplication of the subband physical microphone signal and the subband error signal.

15. The noise cancellation system of claim 10, wherein the subband weight transformation process comprises a fast Fourier transformation of each subband virtual path to obtain a frequency-domain subband virtual path.

16. The noise cancellation system of claim 15, wherein the subband weight transformation process further comprises an inverse fast Fourier transformation of the frequency-domain subband virtual path to obtain the adaptive weight filter in a time-domain.

17. The noise cancellation system of claim 10, wherein the physical microphone signal comprises a product of filtering road noise by an anti-noise signal produced by a transducer.

18. A method comprising:

acquiring a physical microphone signal using a physical microphone, wherein the physical microphone signal is correlated with a filtered noise signal in a vehicle cabin;

processing the physical microphone signal with an adaptive weight filter to estimate a virtual secondary path from the physical microphone to a plurality of virtual microphones;

acquiring a residual signal from the plurality of virtual microphones positioned in the vehicle cabin;

decomposing the physical microphone signal and the residual signal into a plurality of subband signals;

calculating a subband gradient for each subband based on a decomposed physical signal and a decomposed residual signal;

calculating a normalized step size for each subband based on a power contribution of the physical microphone signal and a constant value that is adjusted based on a threshold normalized step size, the threshold normalized step size a non-zero, positive value threshold determined via a calibration operation;

updating a set of subband virtual path weights based on the subband gradient and the normalized step size;

weight transforming the updated set of subband virtual path weights to a time domain using an Inverse Fast Fourier Transform (IFFT); and processing the residual signal based on the transformed subband virtual weights to reduce noise in the vehicle cabin.

19. The method of claim 18, wherein the subband gradient for each subband comprises a complex conjugate multiplication of a subband physical microphone signal and a subband error signal.

20. The method of claim 18, wherein the decomposing comprises filtering the residual signal and the physical microphone signal through an analysis filter bank comprising a plurality of subband filters, each subband filter corresponding to a distinct frequency range within a residual noise spectrum of the vehicle cabin.

* * * * *